United States Patent [19]

Shipley

[11] Patent Number: 5,818,617
[45] Date of Patent: *Oct. 6, 1998

[54] OPTICAL DATA COMMUNICATION AND LOCATION APPARATUS, SYSTEM AND METHOD AND TRANSMITTERS AND RECEIVERS FOR USE THEREWITH

[75] Inventor: Robert T. Shipley, Oakland, Calif.

[73] Assignee: Fisher Berkeley Corporation, Oakland, Calif.

[ * ] Notice: The term of this patent shall not extend beyond the expiration date of Pat. No. 5,633,742.

[21] Appl. No.: 792,761

[22] Filed: Feb. 4, 1997

Related U.S. Application Data

[60] Division of Ser. No. 532,045, Sep. 21, 1995, Pat. No. 5,633,742, which is a continuation-in-part of Ser. No. 309,848, Sep. 21, 1994, abandoned.

[51] Int. Cl.$^6$ ........................................................ H04J 14/08
[52] U.S. Cl. ........................... 359/135; 359/143; 359/144; 359/155; 359/189; 370/213
[58] Field of Search ..................................... 370/213, 311; 375/239; 329/313; 359/185–186, 136–137, 161, 155, 189, 143, 144

[56] References Cited

U.S. PATENT DOCUMENTS

| | | | |
|---|---|---|---|
| 3,767,855 | 10/1973 | Ueno | 375/329 |
| 4,151,407 | 4/1979 | McBride | 359/142 |
| 4,731,785 | 3/1988 | Ferenc | 370/60 |
| 5,062,151 | 10/1991 | Shipley | 359/154 |
| 5,394,410 | 2/1995 | Chen | 371/70 |
| 5,402,469 | 3/1995 | Hopper | 379/93 |
| 5,633,742 | 5/1997 | Shipley | 359/137 |

*Primary Examiner*—Leslie Pascal
*Attorney, Agent, or Firm*—Flehr Hohbach Test Albritton & Herbert

[57] ABSTRACT

An optical data communication and location apparatus for at least one location in a facility having at least one receiver at said at least one location. A plurality of portable transmitters provides optical wireless data links with the receiver. Each of the transmitters has a power supply with circuitry for transmitting data packets over said optical wireless data links to the receiver. The circuitry for transmitting data packets generates a data code having at least two time frames, each of the at least two times frames being divided into at least two data time slots. Each frame has exactly one pulse in one data time slot whereby in each data packet, there is encoded n-bits of binary data where $2^n$ is equal to the number of time slots in each frame.

2 Claims, 9 Drawing Sheets

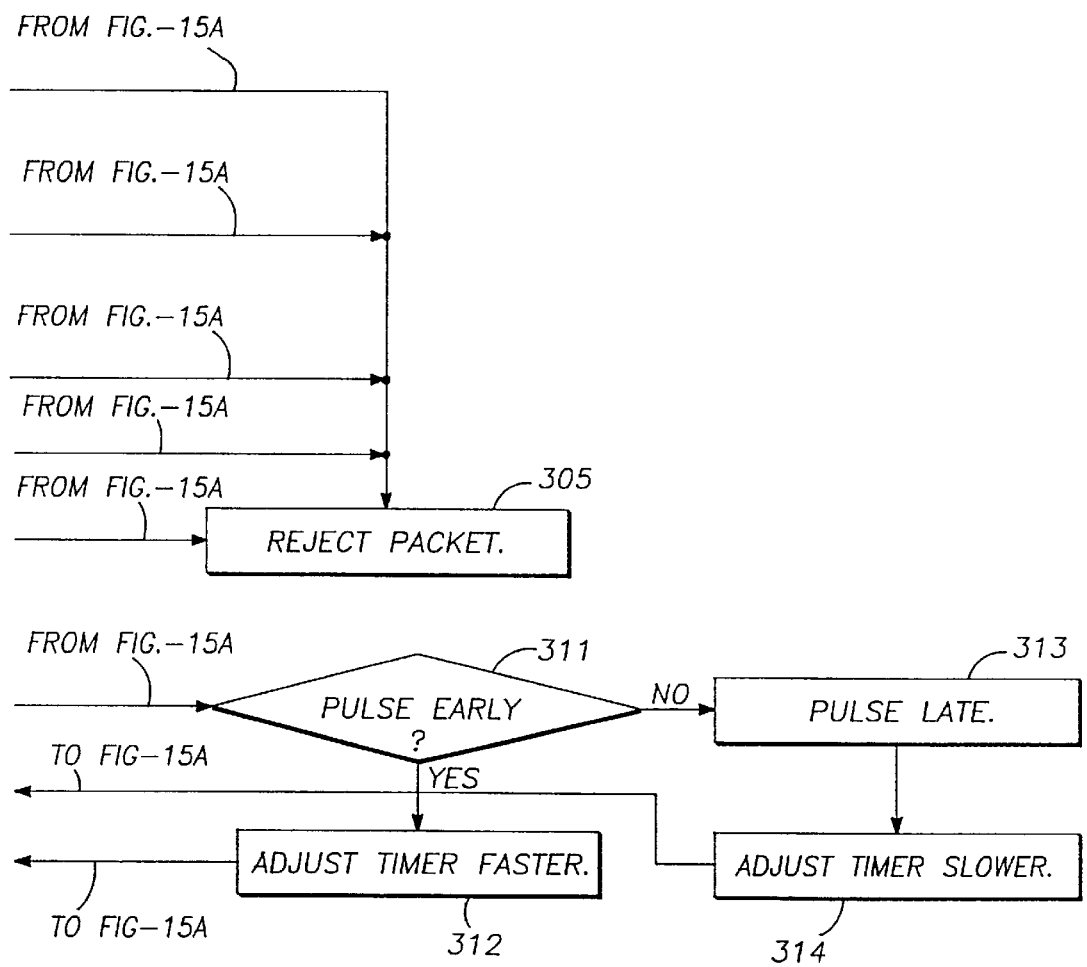
FIG.—15B

OPTICAL DATA COMMUNICATION AND LOCATION APPARATUS, SYSTEM AND METHOD AND TRANSMITTERS AND RECEIVERS FOR USE THEREWITH

This application is a divisional of application Ser. No. 08/532,045 now U.S. Pat. No. 5,633,792 filed Sep. 21, 1995 which is a continuation-in-part of Ser. No. 08/309,848, filed Sep. 21, 1994 now abandoned.

This invention relates to an optical data communication and location apparatus, system and method and transmitters and receivers for use therewith.

Communications systems heretofore have employed fixed band and spread spectrum radio frequency (RF) energy. However, radio based systems which have included portable transmitters suffer from serious drawbacks including their susceptibility to other RF noise sources; overcrowding of RF channels; and, the unpredictability of areas where reception is interrupted by the construction materials used in the building. Further, the use of RF systems for locating mobile items or individuals through triangulation does not yield a practical system due to lack of resolution and the time delay in the many calculations required. RF locating systems are also not cost effective for use inside a building, owing to their complexity. Other portable location system utilized ultrasonics to transmit the data. Ultrasonic energy for data communication and locating systems have been found to be impractical because of echoes and data errors from ambient noise. The ultrasonic transducers used are generally fragile. Only low data rates are achievable because of relatively low ultrasonic bandwidth. Infrared systems, although portable, have awkward weight and sizes with limited battery life limiting widespread usage.

To permit the use of a battery of even the relatively large size and capacity, transmitted infrared power had to be held to a low value. However, to realize a reasonable signal-to-noise level at the receiver, line-of-sight signal paths over a controlled distance between the infrared transmitter and receiver were proposed. Such line-of-sight systems require aligning the transmitter and the receiver to establish and maintain the transmission path during the entire period of transmission. This was proposed to be accomplished by mounting a fixed receiver over a doorway to look vertically downward. The transmitter was to be worn in a pocket of a wearer positioned to emit infrared signals upward. For such a system to function, transmissions had to be frequent enough and of short enough duration so as to allow the receiver to detect a full transmitted message during the period of time that the transmitter moved through the doorway. A diffuse infrared system is shown in U.S. Pat. No. 5,062,151. While the system does not require line-of-sight transmission to achieve portability, the power consumption is so large as to require a multi-cell, rechargeable battery. A battery sized for portability must be recharged frequently, at least every other day. Aside from the need for many rechargers and the inconvenience, the requirement for recharging makes locating mobile inanimate objects such as equipment, files, etc. impractical because of the need to frequently retrieve the transmitter for recharging. The requirement that the transmitters used to locate personnel be periodically returned to a charger is undesirable, in that while they are charging for eight to 16 hours, they cannot perform their intended function. Also, if the wearer inadvertently forgets to recharge the transmitter, the transmitter cannot be used until it is recharged. The requirement for a multi-cell battery sets a lower limit on the size and weight of the portable transmitter making it more cumbersome to wear or more difficult to attach to small, mobile objects.

In the system disclosed in U.S. Pat. No. 5,062,151, the first and only notification that a battery charge is becoming depleted is that the person or object associated with the transmitter can no longer be located. To add a battery checker to detect a low battery without the battery checker itself adding significantly to the drain on the battery being monitored presents a problem.

It is known that transmitting data using infrared pulses in lieu of modulating an infrared carrier frequency can reduce dramatically the power consumption of the transmitter, and any reduction in power consumption translates into a smaller battery and a longer useful battery life. The transmitted data of previous infrared systems is comprised of packets of ones and zeros. The presence of an infrared pulse is interpreted as either a one or a zero. The absence of a pulse represents the opposite. Data words containing mostly ones (assuming ones are the presence of infrared pulses) consume vastly more power than those with mostly zeros. The data sent by each such transmitter has a different quantity of pulses. Therefore, the power consumption of each transmitter is different. This causes the battery recharge interval to be set at that required for the transmitter which transmits all ones.

The larger and more complicated the facility, the more the need for portable communication with, and the locating of personnel and mobile items. However, in previous systems when the quantity of transmitter codes is increased, the quantity of pulses required to define a transmitter increases, and therefore power consumption increases dramatically. Any additional data such as battery condition further adds to the current drain and resultant reduction in battery life. Further, the use of DC-to-DC converters to multiply the battery voltage to that necessary to drive infrared emitters in series wastes considerable power. Any DC-to-DC converter will have losses which reduce battery life. The obvious alternative of adding batteries in series to achieve the necessary voltage for high power transmissions suffers from a substantial weight and cost penalty. The use of a resistor in series with the emitters to control current consumes the battery power, increasing battery size and decreasing battery life.

Transmitters being portable are susceptible to being lost or damaged. It is therefore desirable to be able to easily reprogram replacements. Prior art transmitters had their identification codes programmed with hardware jumpers or switches. In large systems, the quantity of elements such as switches needed to hard code transmitter data is impractical and costly. While it was known that the identity codes could be stored in solid state non-volatile memory, such memory is costly and consumes significant power, adding to battery size and decreasing battery life. Another factor precluding the use of conventional memory is the complication of programming the identification code. The low currents and high circuit impedances needed for low power consumption and small battery size make the use of common, low cost, electrical contact material impractical. The infrequent use of contacts for programming causes thin layers of oxidation and contaminants to coat the contacts, making them unreliable.

In the communication system disclosed in U.S. Pat. No. 5,052,151 the room receiver wiring requirements were onerous for medium to large size systems. For cable runs of reasonable length, the wire gauge must be large due to the high current consumption of the receivers on the run. While the parallel address and data busses provide for the large data throughput required of such a communications system, the large quantity of conductors which must be connected at each room and at a central logic facility makes the cost of the installed system undesirably high.

In systems with multiple transmitters, there is a need to prevent successive collisions of transmitted infrared data from separate transmitters in the same location. An accurate time base is a requirement for asynchronous data transmission. An accurate, high speed clock is a requirement for low power infrared transmission. It is well known that quartz crystals, and in some applications, even ceramic resonators provide an excellent and stable time base for such communication. However, because of their very high stability, once the serial transmissions of two transmitters with stable clocks begin to collide, they will tend to continue to collide for a very long time. A significant limitation of previous prior art systems was that they either lacked a method to prevent successive collisions of transmitted infrared data due to two or more transmitters with synchronized transmit intervals, or lacked a method to detect corrupt data caused by a collision or they consumed additional power to prevent collisions. Such erroneous data causes the database to be corrupted. In U.S. Pat. No. 5,062,151 successive collisions were prevented by the use of a combination of two transmit intervals that are unique to each and every transmitter. However, this is cumbersome to program and consumes additional power during transmission. For systems with a large number of transmitters, there may not be sufficient quantities of unique transmit interval pairs to assign to each transmitter. There is therefore a need for a new and improved optical data communication and location system and transmitters and receivers for use in the same.

In general it is an object of the present invention to provide an optical data communication and location apparatus, system and method and transmitters and receivers for use therewith which provides continuous real time information on the location of people, equipment, files and other mobile objects in a facility.

Another object of the invention is to provide an apparatus, system and method of the above character which is reliable and immune to noise.

Another object of the invention is to provide an apparatus, system and method of the above character in which data is generated in real time without requiring high speed dedicated wiring.

Another object of the invention is to provide an apparatus, system and method of the above character in which locating a transmitter is a passive activity requiring no action on the part of a person other than wearing the transmitter.

Another object of the invention is to provide an apparatus, system and method of the above character in which the wearer of the transmitter can spontaneously send messages such as to summon aid to the location of the wearer without the need for the wearer to leave the location or to be near a telephone or other fixed communication device such as a nurse call station.

Another object of the invention is to provide an apparatus, system and method of the above character which utilizes a non-volatile memory for storing system data.

Another object of the invention is to provide an apparatus, system and method of the above character which does not require line-of-sight transmission.

Another object of the invention is to provide an apparatus, system and method of the above character in which large quantities of transmitters and receivers can be accommodated without requiring large amounts of power for either.

Another object of the invention is to provide an apparatus, system and method of the above character in which data entry into the transmitters, receivers and central logic unit is automated.

Another object of the invention is to provide an apparatus, system and method of the above character in which data packets of a predetermined length.

Another object of the invention is to provide an apparatus, system and method of the above character in which data packets are transmitted by generating a data code having at least two frames with each frame being divided into at least two time slots with each frame consisting of exactly one pulse in one time slot with each packet having encoded thereon n-bits of binary data wherein $2^n$ is equal to the number of data time slots in the frame.

Another object of the invention is to provide transmitters for the apparatus and system which are portable and which are small and compact and have a power supply permitting their use for extended periods of time as for example periods of approximately one year and greater.

Another objection of the invention is to provide transmitters of the above character in which a battery is included in the portable transmitter for providing the power supply.

Another objection of the invention is to provide transmitters of the above character in which the battery power consumption is decreased by a factor of n where $2^n$ is equal to the quantity of time slots in each frame.

Another objection of the invention is to provide a transmitter of the above character which is very light, weighing less than one ounce complete with its installed battery.

Another object of the invention is to provide an apparatus, system and method of the above character in which the transmitters utilized therein are electronically programmed with an identity code assigned to an individual or attached to a piece of equipment or other object.

Another objection of the invention is to provide transmitters of the above character which are provided with a plurality of infrared emitters so that useful reflected energy is provided.

Another objection of the invention is to provide transmitters of the above character which are provided with side mounted switches for sending messages.

Another object of the invention is to provide an apparatus, system and method of the above character in which the battery life can be checked without significantly shortening battery life.

Another object of the invention is to provide an apparatus, system and method of the above character which can automatically identify transmitter batteries which need to be replaced within a specified period of time.

Another object of the invention is to provide an apparatus, system and method of the above character in which the identities of the transmitters are stored in inexpensive volatile memory which need not be reprogrammed after battery replacement.

Another object of the invention is to provide an apparatus, system and method of the above character in which battery consumption in the transmitter is limited for slow moving objects.

Another object of the invention is to provide an apparatus, system and method of the above character in which the receiver physically closest to a transmitter can be ascertained.

Another object of the invention is to provide an apparatus, system and method of the above character which minimizes infrared data collisions even when many transmitters are in use.

Another object of the invention is to provide an apparatus, system and method of the above character which assures that if infrared collisions occur between two transmitters they will not occur on the next transmission from a transmitter.

Another object of the invention is to provide an apparatus, system and method of the above character which does not record false data such as that occurring from collisions and noise.

Another object of the invention is to provide an apparatus, system and method of the above character which has the capability of sending synthesized and analog voice messages to receivers which can transmit such messages to wearers of transmitters of the system.

Another object of the invention is to provide an apparatus, system and method of the above character in which the data throughput is automatically increased in emergency situations.

Another objection of the invention is to provide transmitters of the above character which have the capability of functioning without the use of batteries.

Additional objects and features of the invention will appear from the following description in which the preferred embodiments are set forth in detail in conjunction with the accompanying drawings.

FIG. 3 is a schematic block diagram of the magnetic programmer.

FIG. 4 is a schematic block diagram of the infrared programmer.

FIGS. 12A, 12B and 12C show three examples of pulse timing and how they are dealt with.

FIGS. 15A and 15B show a flow chart illustrating the operation of the invention.

In general, the optical data communication and location system of the present invention is for use for at least one location with at least one receiver at said at least one location. A plurality of portable transmitters are provided at said at least one location. Optical wireless data links are provided for connecting the plurality of portable transmitters to said receiver. Each of the portable transmitters has means for transmitting data packets and is provided with a power supply for supplying power to the means for transmitting data packets. The means for transmitting data packets in each of the transmitters including means for generating a data code having at least two time frames with each time frame being divided into at least two data time slots. Each frame consists of exactly one pulse in one data time slot so that n-bits of binary data can be encoded in the data packet where $2^n$ is equal to the number of data time slots in each frame.

Figure 1:
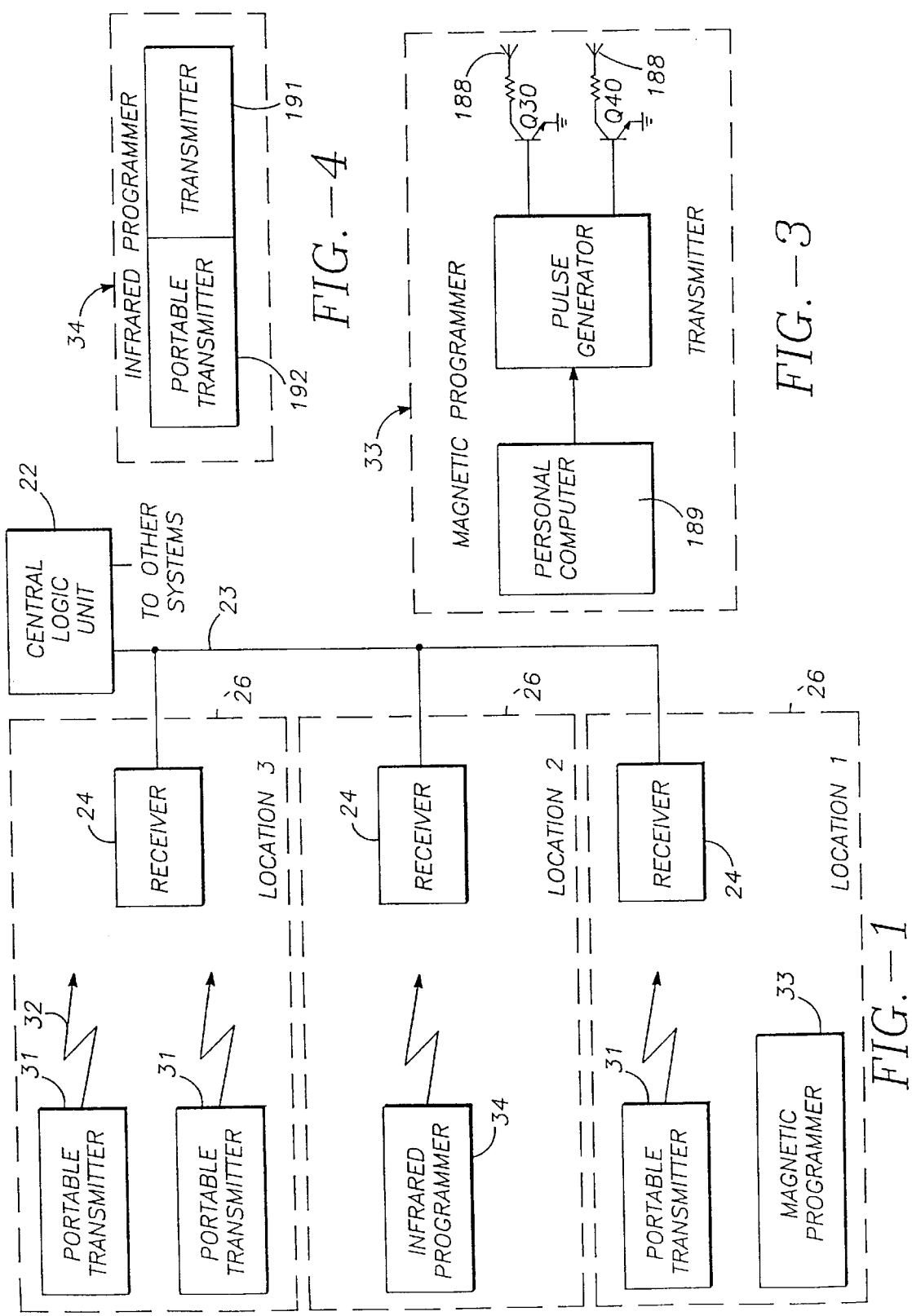
FIG. 1 is a schematic diagram of an optical data communication and location apparatus and system incorporating the present invention which include a central logic unit, a plurality of receivers at various locations and a plurality of portable transmitters, as well as an infrared programmer and a magnetic programmer.

More particularly as shown in FIG. 1 the system and/or apparatus 21 of the present invention consists of a central logic unit 22 which can be located in a central location which is connected by a conventional communication link 23 to a plurality of receivers 24 located at a plurality of locations 26 identified as locations 1, 2 and 3 in FIG. 1. The receivers 24 are adapted to receive optical data from a plurality of transmitters 31 at each location 26 by an optical link indicated at 32. As shown in FIG. 1, the control logic unit can also be connected to other systems 21 as shown. The apparatus 21 also includes a magnetic programmer 33 for programming the portable transmitters 31 and an infrared programmer 34 for programming the receivers 24.

The central logic unit 22 consists of a communication interface 36 that can be of any suitable type. For example it can consist of a twisted pair of telephone wires, high speed data communications cable, carrier current over the building electrical power wiring, low power radio frequency or other means appropriate to the system installation.

The communication interface 36 is connected to a central processor 37 of a suitable type as for example a 486 microcomputer. The central processor 37 is utilized for receiving data from the receivers 24 processing and storing such data for access by other systems 38 through a system interface 39. The other systems 38 can include telephone systems, intercoms, nurse call systems, inventory control systems, location display systems, computer networks, control systems, security systems, energy management systems, alarm systems and the like. The central processor 37 can also send data to the receivers 24. Such data can be used by the receivers to control speakers, piezo audio transducers, relays, etc. included in or attached to some or all of the receivers 24. The central logic unit 22 as shown also includes an audio switch 41 which can be utilized for sending audible messages to the receivers 24 from a voice synthesizer 42. The audio switch 41 can also be connected to other systems 38 which can include other audio communication systems to provide instant communication over receivers equipped with speakers. The control logic unit also includes a power supply 43 which is connected to a power interface 44.

The receiver 24 which typically is in a fixed location includes a photo detector consisting of one or more biased diodes (not shown) which receive the transmitted optical signals which can be in the form of infrared pulses from a transmitter 31. The photo detector 46 converts the infrared signals to electrical signals which are amplified by an amplifier 47. The amplified electrical signal is supplied to a level detector 48 and simultaneously to a packet decoder 49. In accordance with the present invention, the level detector 48 assigns a code to the electrical signal which is proportional to the power of the received signal. This code indicating the infrared power level is presented to a main processor 51. The packet decoder 49 checks the validity of the received code and passes proper codes on to the data registers 52. The data registers 52 are readable by the main processor 51 which communicates valid received data to the central logic unit 22 through a communication interface 53 that is connected to the communication interface 36 of the central logic unit 22. The communication interface 53 can be of the same type as the communication interface 36. A main processor 51 manages local output control from the receiver as shown by the block 57 which can include enunciation speakers, lights, relays, locks, displays, etc. under its own program or at the instruction of the central processor 37 of the central logic unit 22. Local control and enunciation elements can include visual indicators, audible enunciators, audio switches to local speakers, door releases, data transmitters and the like. The receiver 24 can derive its power through a power interface 58 from a power interface 44 in the central logic unit 22 over a hard wired cable system or alternatively from building power of other suitable source.

Each receiver 24 also includes a timing clock 61 connected to the main processor 51. The receiver 24 also includes a non-volatile memory 62 for storing its address. This stored address has the advantage of allowing a common communication pathway between the receivers and the central logic unit 22. Receivers 24 can be programmed rapidly and reliably by utilizing a specially coded infrared transmitter as hereinafter described. The main processor 51 utilizes the power level code from the level detector circuit 48 to determine the proximity to the transmitter 24 as well as when the infrared signals contain a programming command. Upon receipt of a programming code from a transmitter 24, the main processor 51 stores the identity code into the non-volatile memory 62. The identity code and the physical location of the receiver 24 can be stored on a portable computer. The computer can then send the programming command and the identification data to the specially coded portable infrared transmitter 31 via the external input to the user data block 66 in the transmitter 31. The transmitter 31 then programs the receiver with receiver identification data via the infrared signal.

In connection with the receiver 24 hereinbefore described, it should be understood that the embodiment described is preferred for many applications. However, it should be understood that many of the functional elements such as data registers 52, the main processor 51 and the packet decoder 49 can be combined with other functional components for economy purposes and centrally located elsewhere. Some of the elements of the receiver 24 such as the main processor 51 can be shared by a number of receivers without changing the function of the receiver. The logic elements shown in the block diagram in FIG. 2 have been shown separately for clarity. However, it should be understood they can be integrated for cost and performance reasons if desired.

Figure 2:
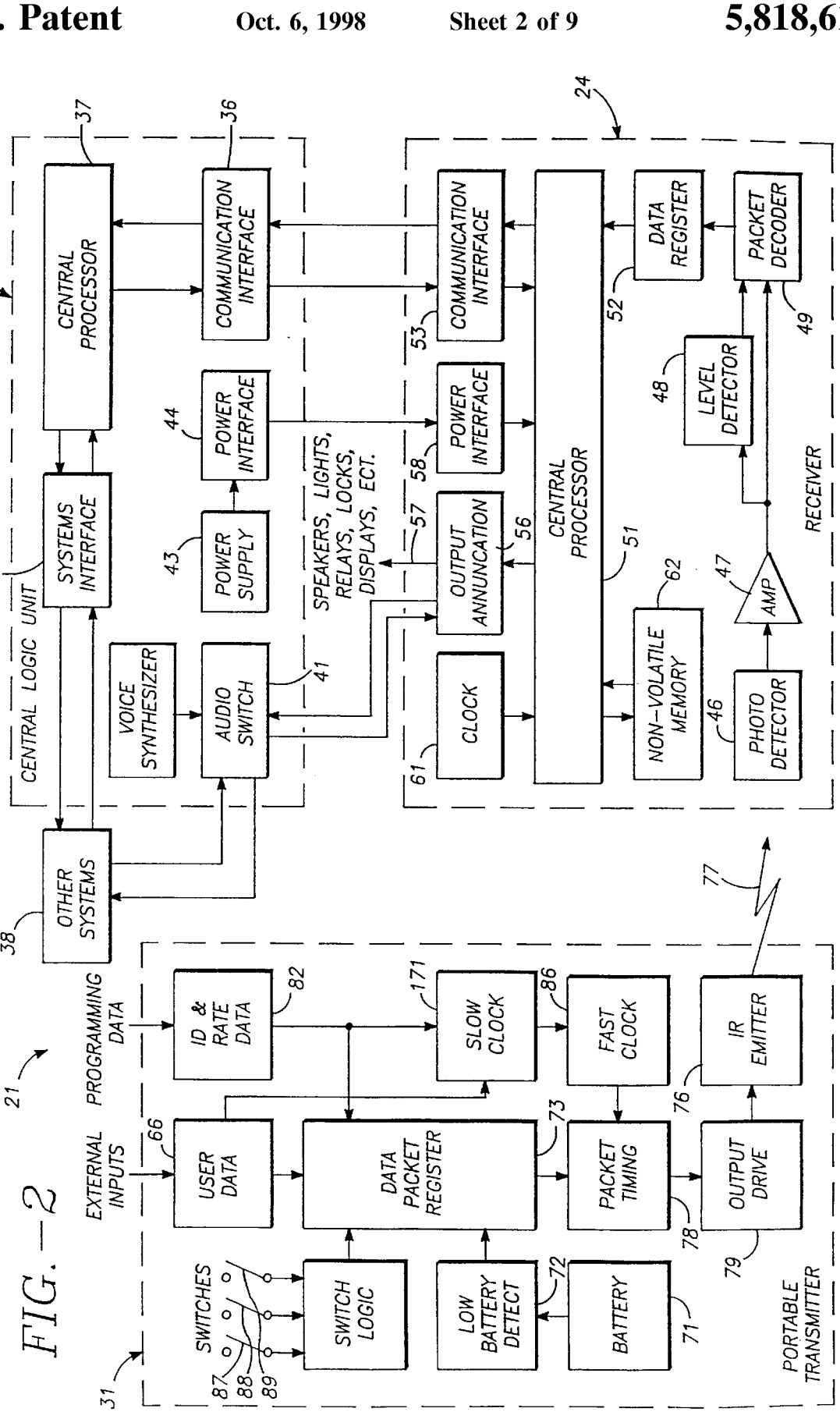
FIG. 2 is a schematic block diagram showing the components of the central logic unit, a receiver and a portable transmitter utilized in the apparatus and system shown in FIG. 1.

The portable transmitter 31 as shown in FIG. 2 includes a power supply in the form of a battery 71 which is connected through a low battery detect circuit 72 to a data packet register 73. The transmitter 31 in accordance with the present invention is capable of automatically and periodically sending data to a fixed receiver 24. Each portable or mobile transmitter 31 may also transmit data in response to an external input into the user data block 66. Mobile transmitters 31 utilized in connection with the present invention provide an optical output which in the case of the present invention is infrared. The transmitters are of a type which are to be carried by people or mounted on movable objects and typically include at least one infrared emitting diode which emits a series of infrared pulses. In connection with the present invention, several diodes as for example three are utilized as hereinafter described to transmit simultaneously to increase the modulation of the infrared energy level in the area of a room in which the transmitter 31 is located. These infrared diodes are indicated by the block 76 labeled "IR emitter". The emitted pulses are represented by the arrow 77. As hereinafter explained, the emitted pulses form a coded message packet which contains a code uniquely identifying the transmitter 21 as well as transmitter status information, including condition of the battery from the low battery detector 72. This information is supplied from the data packet register 73 through a packet timing block 78 through an output drive 79 connected to the IR emitter 76. The remainder of the message supplied from a transmitter 31 can contain user data input externally from switches, relays, a microcomputer, a terminal, etc.

When the transmitter 31 is transmitting automatically and periodically, a slow clock 31 controls the transmit interval rate. The unique identity code of the transmitter 31 and the transmit interval rate can be externally programmed into the identification and rate data register 52 as hereinafter explained. To accommodate the possibility of many thousands of transmitters in a system, it is desirable that the programming for the transmitters 31 be fast and reliable and be accomplished in the manner hereinafter described.

The slow clock 31 is utilized to enable the fast clock 86 only during transmission. The fast clock 86 is used to generate the narrow infrared pulses and to create proper signal timing. Identity, status and any user data are assembled into the data packet in the data packet register 73. Packet timing logic 78 shifts the data packet through the output drive 79 to the infrared emitter 76.

The infrared transmitter 21 has the capability of transmitting an identification packet at a programmable interval such as every two seconds. Longer or shorter repetition intervals can be programmed where the speed of movement of the transmitter dictates the same. The packet of the transmitter is used to locate the wearer of the transmitter in the manner hereinafter described. In addition, buttons hereinafter described on the transmitter operate momentary switches 87, 88 and 89 individually or in combination to send messages to the receiver 24 and to the central logic unit 22 as hereinafter described.

In order for the infrared data communication system 21 of the present invention to be able to provide accurate location information at an interval between transmissions from the transmitters 21, the interval must be short enough to permit detection at a new location for a transmitter when the transmitter 31 is moving. For example, a transmission interval of every fifteen seconds is typically too long for locating people because in 15 seconds a person can easily travel between several offices away from the location of the last transmission.

A specific embodiment of a transmitter 31 incorporating the present invention is shown in FIGS. 3–6. As shown therein, the transmitter 31 consists of a case 101 formed of a suitable lightweight material such as plastic and is provided with front and rear covers 102 and 103 which are rectangular in shape which can be fastened together by suitable means such as ultrasonic welding. The covers 102 and 103 are rectangular to provide a case 101 which has a suitable dimension as for example a height of 2.2" and a width of 2.0" and a thickness of 0.25". The case 101 is provided with a top 106 and a bottom 107 and first and second parallel sides 108 and 109. The case is provided with a slot 111 which extends through the front and rear covers 102 and 103. A strap 112 formed of a suitable flexible material such as plastic extends through the slot 111 and is snapped together by a snap fastener 113 of a conventional type. A metal spring clip 114 of a conventional type is secured to the strap 112 by a rivet 116. Other means of attachment can be used when the transmitters 31 are to be attached to movable objects, such as a strap having a conductive link therein which when broken will cause the transmitter to send an alarm message.

A printed circuit board 121 is mounted within the case 101 and carries the three momentary contact switches 87, 88 and 89 which are aligned in a row and are accessible through the side 109 of the case 101 through cutouts 122 provided in the front and rear covers 102 and 103. The printed circuit board 121 also carries three spaced-apart light-emitting diodes 126 mounted in the upper portion of the printed circuit board 121 which serve as infrared emitters 76 in FIG. 2 in accordance with the present invention. The diodes 126 are exposed to ambient through holes 127 provided in the front cover 102 so that infrared energy emitted therefrom is propagated into a space in a direction extending forwardly and sideways of the front cover 102 of the case 101. It should be appreciated that the infrared emitters can be totally enclosed in the case 101 when the case 101 is made of an infrared transparent material such as an acrylic. The battery 71 in a removable molded holder 131 is inserted into a slot 132 in the lower side 107 of the case 101. The battery 71 can be of a suitable type as for example a Duracell 3 volt battery identified as DL 2032. The battery 71 is connected to the printed circuit board 121 by spring loaded contacts (not shown) on the printed circuit board. The printed circuit board 121 contains a number of dual in-line integrated circuit packages mounted thereon of the type hereinafter described for performing various functions in the transmitter 31.

In order to make possible radio frequency magnetic programming of the transmitters 31 as hereinafter described, the printed circuit board 121 is provided with a pair of antenna loops 136 which are etched onto the printed circuit board 121. The antenna can have a suitable configuration as for example a circular configuration of 6 millimeters in diameter square and spaced apart a suitable distance as for example 12 millimeters. As hereinafter explained, when this pair of antenna loops 136 is brought into close proximity to a phased pair of programming antenna, a differential programming signal is detected and loaded into identification and data register as hereinafter explained.

This radio frequency programming precludes the need for electrical contacts which can become corroded or contaminated. The elimination of the electrical contacts reduces the cost of the transmitter. The radio frequency programming also permits programming to be done automatically using a personal computer by establishing a data base with a one-to-one correspondence between user and transmitter identity codes so that programming errors can be prevented.

Figure 5:
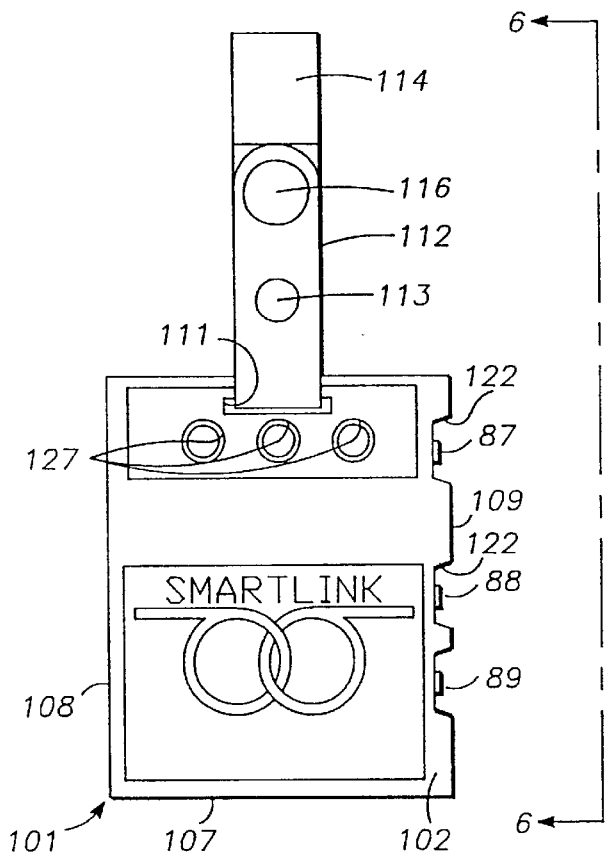
FIG. 5 is a front elevational view of a portable transmitter utilized in the system and/or apparatus of the present invention.
Figure 6:
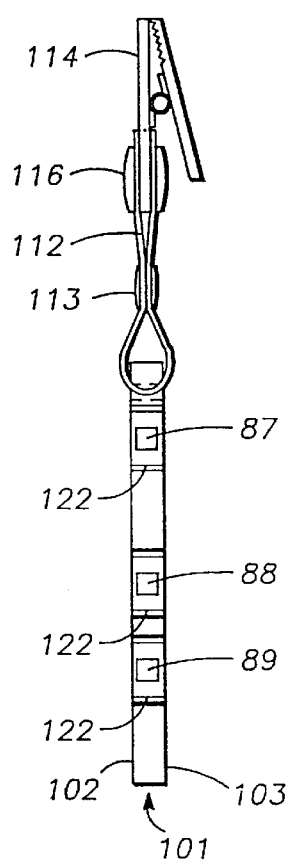
FIG. 6 is a side elevational view looking along the line 6—6 of FIG. 5.
Figure 7:
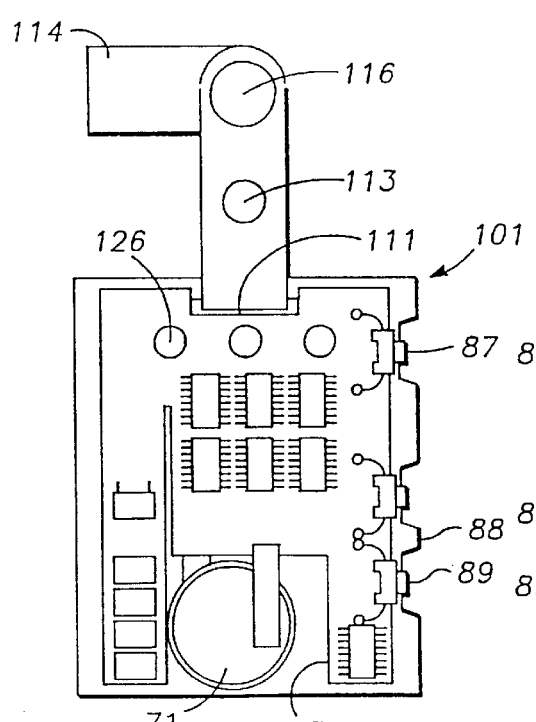
FIG. 7 is a view similar to FIG. 5 but showing the front cover removed.

The electrical components which are shown on the printed circuit board 121 in FIGS. 5 and 6 are shown schematically in the circuit diagram shown in FIG. 7. As hereinbefore described, power for the printed circuit board 121 is supplied by the three-volt battery 71 mounted thereon. The battery 71 is a 200 milliampere-hour lithium battery which as hereinafter explained with a two-second transmit interval for the transmitter 31 for 24 hours per day will provide adequate power for approximately one year. Such a transmitter with an eight-second transmit interval would have sufficient power from such a battery to operate for approximately three years.

As shown in the lower left margin of the drawing in FIG. 7, the battery 71 has its positive terminal connected to a Vcc terminal 141 and has its negative terminal connected to a ground 142. It is known that a battery such as battery 71 has a relatively high internal impedance to fast, high current pulses. A plurality, as for example three, high frequency tantalum capacitors 143 are connected in parallel with the battery to bypass high frequency currents to provide a resultant low impedance to permit the flow of large battery currents to produce high energy pulses. Various other portions of the circuitry as shown in FIG. 7 are connected to the Vcc terminal 141 and to ground 142 to receive power from the battery 71.

For transmitters having lower power requirements of the type hereinafter described, an alternative power source rather than a battery can be utilized. For example, if the system or apparatus 21 of the present invention is installed in an urban area, there are multiple sources of radio frequency energy such as from radio stations, cellular phone systems, etc. for transmitters of the present invention having longer transmit intervals and therefore lower power requirements. Such transmitters can be powered from radio frequency energy captured by antenna constructed from multiple turns of wire (not shown) disposed within the interior of the case 101. Where weight and size is not an issue a conventional antenna can be mounted on the case 101 to pick up the radio frequency energy. For transmitters which need not operate in dark locations, the transmitters can be powered from a photovoltaic cell (not shown) exposed to the exterior of the case 101. For locations where radio frequency energy may be insufficient to provide power for the transmitters, a combination of radio frequency and photovoltaic cell power can be utilized. In locations where insufficient radio frequency energy is present in the location where the system is installed a user-installed radio frequency transmitter can be provided in the facility to power the transmitters. Also, mechanical generators which are powered by motion of the wearer of the transmitter can be utilized for supplying power to the transmitter.

The transmitters 31 of the present invention are encoded by external magnetic pulse generators in a programming unit having a programming antenna to supply radio frequency energy to the loop antennae 136 provided in the case 101 as previously described. They provide an inductance of about 100 nH. Power consumption is zero except when programming the transmitter identity code. The added weight of the printed conductors and circuit space for the programming antennae is negligible. The magnetic flux generated by the two matching loops 136 in the programmer are in opposite directions. Transistor switches Q3 and Q4 serve to drive the loops 136 from 5 volts to ground through a resistor as shown. By way of example, the transistors Q3 and Q4 are driven at 20 Mhz with an on time of 15 nanoseconds and an off time of 35 nanoseconds with fly back voltage being limited to 5 volts. The switches Q3 and Q4 provide a PD output on conductor 146 and a PCK output on conductor 147 to a multiplexer 151. The outputs PD and PCK are a logic one when pulses are present at the correct strength and orientation on the conductors 146 and 147. Otherwise they are a logic zero. With this information a predetermined sequence can be utilized for programming the transmitter 31.

The multiplexer 151 forms part of an identification and data register 152 consisting of integrated circuits U8, U9, U10 and U14. These integrated circuits in combination form a 24-bit shift register which holds the transmitter identification data as well as other data. Register 153 is initially programmed by the program circuit hereinbefore described. U8, U9 and U10 are shift registers 153 of a suitable type such as 74HC164. The multiplexer 151 is an integrated circuit quad multiplexer as for example a 74HC157.

As each infrared packet is transmitted, the 24 bits of the register 152 are shifted once around a loop. Three of the bits are selected at a time to control the timing of one of the eight infrared pulses of an infrared packet. During message transmission by the transmitters as hereinafter described, each individual register 153 is an 8-bit circular register controlled by the multiplexer 151.

The output SA3 of integrated circuit U10 is fed to integrated circuit U7 which serves as a multiplexer 156 which combines the programmed transmit interval and two high order ID bits supplied to it from SA3 with switch and battery status information. The outputs SA1 and SA2 of the shift registers U8 and U9 as well as the output SA3M from the multiplexer U7 are supplied to a packet timing circuit 158.

The multiplexer 156 is provided with inputs of three different frequencies, namely 3.5 KHz, 7 KHz and 14 KHz. It is also supplied with a BOK input and a "data in" input which are provided for a purpose as hereinafter described. The packet timing circuit 158 consists of integrated circuits U12 and U13 which are 74HC161 binary counters and an integrated circuit U3B, a 74HC393 type 4-bit binary counter. The integrated circuits U12 and U13 control the timing of the eight infrared pulses in the infrared packet. Each of the infrared pulses can be in one of the eight timed slots in the packet. The three outputs SA1, SA2 and SA3M data packet register select the position for each pulse. The packet timing circuit 158 encodes the eight successive 3-bit frames of data consisting of SA1, SA2 and SA3M into eight successive pulses. Three bits of data are successively encoded as a single pulse position in one of eight time slots in each of the eight data frames. Encoding is performed by loading the three bits of data SA1, SA2 and SA3M into integrated circuit U12. As integrated circuit U12 is clocked, an output data pulse is created and the time slot encoded by the 3-bit data preload. After all 24 bits have been coded and sent, the DONE output of U3B resets the fast clock enable circuit 161 after which the transmitter 31 is returned to the low power interval counting mode as hereinafter described.

The packet timing circuit 158 drives an output drive emitter circuit 166. The drive circuit 166 includes Q1, Q2 and Q6 transistor drive circuitry of a conventional type in which the transistor Q6 speeds the turn off time for transistor Q2 to thereby substantially reduce power consumption from the battery.

This transistor turn on circuitry serves to drive short duration high current pulses through the three infrared emitters 127 which are connected in parallel.

In accordance with the present invention in controlling battery life, it is important to maximize the efficiency of which battery power is converted into infrared signals from the emitters 127. By properly selecting the infrared emitters, they can be driven directly from the battery 71 and through the capacitive network 143 without a series limiting resistor. At a 2.7 ampere current, the transistor switch circuitry comprised of the transistors Q1, Q2 and Q6, the bulk resistance of the emitter diodes and the effective series resistance of the battery 71 and the capacitors 43 limit the current to a value which is safe for the emitters and switching the transistor. Consequently almost the entire battery voltage appears across the parallel emitters resulting in optimum power conversion. By way of example, the average current and battery requirements for transmission every two seconds is:

$$\text{Avg. current} = .000002 \text{ for low speed oscillator} +$$
$$.002 \times .00079/2 \text{ for high speed logic} +$$
$$2.7 \times .000016/2 \text{ for infrared LED's}$$
$$= .000024 \text{ amperes}$$

This makes it possible to achieve the battery life hereinbefore described for use in the transmitter 31 of the present invention.

The program circuitry 144 consisting of the transistors Q3 and Q4 are activated by a very high level magnetic field coupled to the printed circuit antenna connected to the bases of the transistors Q3 and Q4. They produce the signal PD on line 146 which disables normal operation and enables the programming of the transmitter identification register 152. The signal PCK on line 147 is then used to clock data on the PD line 146 into the transmitter. The programming signals PD and PCK are controlled by two independent high frequency magnetic pulse generators provided in the special programming unit.

Figure 9:
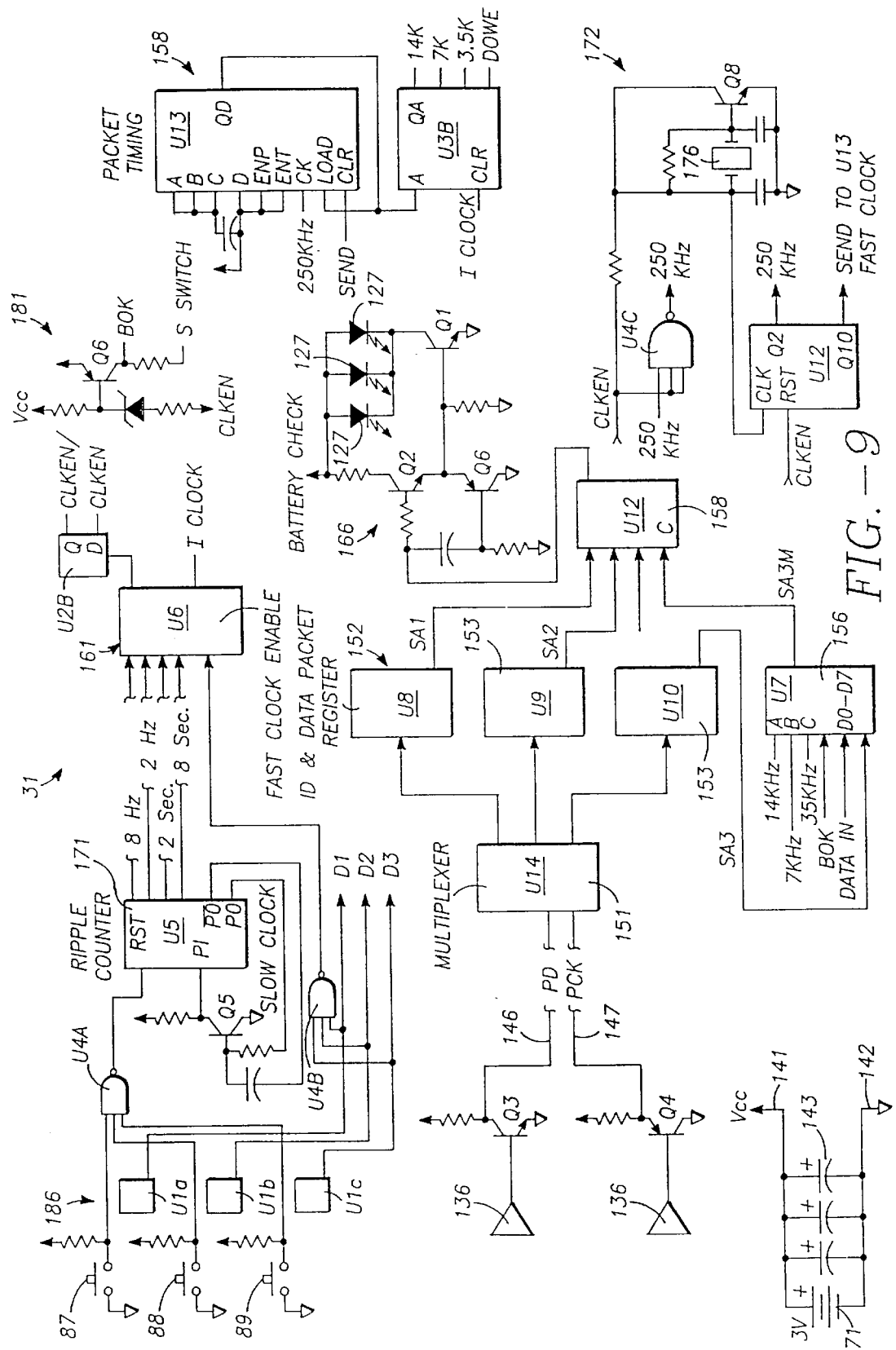
FIG. 9 is a schematic block diagram of the electronic circuitry used in the transmitter.

As shown in FIG. 9, each transmitter 31 is provided with a slow clock 171. The slow clock 171 consists of a 130 Hz resistive-capacitive oscillator which is provided by a transistor Q5 operating in conjunction with integrated circuit U5 which is a 4060-type ripple counter that divides the 130 Hz frequency into selectable transmission intervals and multiple repeat message rates. During the normal interval of transmission, the divided down outputs of integrated circuit U5 are applied to the inputs of the integrated circuit U6 of the fast clock enable circuit 161 as shown in FIG. 7. As shown the outputs from the integrated circuit U5 are 8 Hz and 2 Hz and two seconds and eight seconds respectively. The programmed transmit interval data controls whether the eight-second or the two-second interval clock generates the ICLOCK output.

The ICLOCK output initiates the transmission of a message by the transmitter. When the ICLOCK goes true as a result of integrated circuit U5 counting to the proper transmit interval, integrated circuit U2B generates a CLKEN clock enable signal and its compliment CLKEN/ which controls the fast clock 172 and the mode of the packet register 152. The slow clock 171 is designed to consume less than 2 microamperes of power using standard CMOS circuits.

The fast clock 172 consists of an oscillator 176 which can be of a suitable form as for example an inexpensive ceramic resonator resonating at 1 Mhz in connection with an integrated circuit U11, integrated circuit U4C the transistor Q8 and the associated resistors and capacitors as shown in the drawings. The fast clock 172 operates as follows.

During normal interval transmission, the divided down outputs of U5 are applied to the inputs U6 of the fast clock enable circuit 161. The programmed transmit interval data IV\, controls whether the 8 second or the 2 second interval clock generates the ICLOCK output. ICLOCK initiates the transmission of a message. When ICLOCK goes true as a result of U5 counting to the proper transmit interval, U2B generates a CLKEN clock enable signal and its complement CLKEN\, which control the fast clock 172 and the mode of the packet register 152.

When the fast clock 172 is operating, the transmitter 31 uses much more power; therefore, it is enabled only when needed. One of the four counted-down outputs from the slow clock 171 is selected by the fast clock enable circuit 161 consisting of integrated circuit U6 and flip-flop U2B to start up the fast clock. U11 and U4C are used to time the sending of the infrared packet. Once the fast clock 172 is enabled, it waits one millisecond before sending the packet to allow the ceramic resonator Y1 to stabilize. It then initiates the sending of the infrared packet. As soon as the packet is sent, the fast clock 172 is turned off.

The fast clock 172 and logic use about 2 milliamperes; however, it only consumes power each time a packet is sent for 790 microseconds out of every two seconds. The 1 Mhz output is divided by U11, a 4040 12-stage ripple counter to generate a 250 KHz signal and a SEND signal. A NAND gate U4C inverts the 250 KHz signal to generate a signal 250 KHz\. This oscillator 176 is normally off. These two 250 KHz signals are gated on by CLKEN.

In order to control battery power consumption, the fast clock 172 is only enabled when needed. For this purpose, one of the four counted-down outputs from the slow clock 171 is selected by the fast clock to enable the circuit 161 consisting of integrated circuits U6 and U2B to start up the fast clock 172. Integrated circuits U11 and U4C in the fast clock are used to time the sending of the infrared packet. Once the fast clock 172 is enabled, it waits 1 millisecond before sending the infrared packet to allow the ceramic resonator 176 to stabilize. It then initiates the sending of the infrared packet. As soon as the packet is sent, the fast clock 172 is turned off by the DONE output from H3B.

Although the fast clock and its logic use about 2 milliamperes of battery power, it only consumes that power each time a packet is sent for 790 milliseconds out of every 2 seconds. The output from the fast clock 172 is divided by integrated circuit U11 a 4040 binary ripple counter to generate a 250 KHz signal and a SEND signal. The NAND gate U4C inverts the 250 KHz signal to generate a signal 250 KHz\. This oscillator is normally off. These 250 KHz signals are gated on by CLKEN.

In connection with the slow and fast clocks 171 and 172, power consumption is known to be proportionate to clock oscillation rates. The relatively low rate of the slow clock consumes a very low power which is very desirable to make it possible to minimize battery size for portability and battery life and for reduced operating costs of the system of the present invention. Also to conserve battery power infrared pulses must be very narrow to control power consumption and therefore battery size. Since power consumption is also proportional to the width of an infrared pulse, a high clock speed generating narrow pulses is desirable. However the pulses must be of an instantaneous power magnitude sufficient to modulate the infrared level well above the infrared noise of the room or area where the transmitter is to be detected. The transmitter 31 of the present invention has a slow clock to determine transmit intervals. In between transmissions the fast clock and emitters are disabled. When the slow clock times out, the fast clock and infrared emitters are enabled long enough for the infrared packet to be sent after which they are again disabled to conserve power.

During the transmission of an infrared packet much more power is used. The high power circuitry is in a low power state except during transmission. During transmission the power is kept as low as possible using lowkeeping thes and keeping the clocks as slow as possible. The duty cycle is very low so that the average power is very low.

The transmitter 31 of the present invention has two states of operation. One in which it is transmitting infrared signals; and two when it is counting the time interval between infrared transmissions. When the infrared emitters 127 are conducting, the power consumption is high. They must conduct at least every two seconds to provide accurate location information when they are moving as for example when carried by a person. Therefore, in the optimum transmitter, the emitters 127 must conduct for a very short time and in between transmissions, the slow clock power consumption must be negligible. As hereinafter explained, the transmitters 31 of the present invention transmits a packet of infrared pulses at programmed intervals of either two or eight seconds, although other intervals may be selected as hereinafter described. The two-second interval can be used for persons and items which move rapidly or frequently. The eight-second interval can generally be used for inanimate items such as portable computers, files and other portable equipment which move slowly or infrequently. The data sent in a packet is encoded so that collisions (two transmitters sending at once), weak signals and noise can be detected. Transmit intervals longer than eight seconds generally do not extend battery life significantly so that in most applications of the present invention there is little value in using longer transmit intervals.

The transmitter 31 of the present invention is provided with a battery check circuit 181 which is utilized to monitor the battery 71 periodically to provide an advance warning that the battery will need replacement in the near future. The battery check circuit 181 includes the transistor Q7 and a Zener diode D1 of a suitable type such as a LM385 connected in the manner shown. This battery check circuit 181 tests the battery voltage during every transmitted packet. If the battery voltage is at an acceptable level and a switch message is not being sent, a battery check message BOK is sent along with the normal transmitter identification confirming the battery condition. When the battery is new and the voltage is at 3 volts, and the CLKEN is low and the 3-volt battery voltage appears between the emitter of Q5 and the CLKEN signal. At this voltage the Zener diode conducts base current from transistor Q5 which saturates the collector with a voltage providing a BOK signal indicating that the battery charge is good or satisfactory. When the battery is discharged to the point wherein within one or two weeks the voltage will drop sufficiently so that the range of transmission will begin to be affected, the diode D1 no longer conducts enough current to saturate the transistor Q5 which changes the BOK signal to a level indicating that the battery 71 needs replacement. This signal can be given in any suitable manner as for example a visual signal, printed report, voice warning to the wearer, etc.

As hereinbefore explained, when two transmitters are within range of a receiver it is possible that the two transmitters may transmit at the same time which means that the infrared packets for either or both may be lost to the receiver. The probability of this occurring is the function of time between the time to transmit a packet and the number of transmitters within range of a receiver. Assuming that transmitters transmit every two seconds, two transmitters will transmit overlapping packets once in 3300 times with the time to transmit a packet being 288 microseconds. In the present invention, repeated collisions between packets from two transmitters are prevented by causing random jitter in the repetition rate of the slow clock 171. If the slow clock (packet interval) accuracy is 10 percent, there is an uncertainty of about 2,000 microseconds in the time of successive transmissions. This jitter very quickly resolves successive collisions. If actual clocks match 250 parts per million, two transmitters will not have more than one consecutive collision. To achieve a controlled amount of jitter, the slow clock control in transmit interval does not use a crystal or ceramic resonator for the time base. The relatively precise R-C time base creates jitter which prevents successive collisions of respective infrared packets between multiple transmitters. Because the jitter in the array in the clock is much greater than the packet duration, two transmitters which transmit a packet at the same time are very unlikely to transmit their next packets at the same time. Due to its high impedance and very slow oscillation rate, the slow clock circuit requires very little power between transmissions.

Switch logic circuitry 186 provided in the transmitter 31 as shown in FIG. 7 permits a transmitter to send a message to the system 21. The switch logic circuitry includes integrated circuits U1A, U1B and U2A as well as integrated circuit U3A, U4A and U4B (?) to permit the transmitter 31 to send a message to the system. The integrated circuits U1A, U1B and U2A remember which of the switches have 87, 88 and 89 have been pressed. Integrated circuit U4A detects switch operation and generates the B DOWN signal which resets the slow clock 171. While a switch is being pressed and for 250 milliseconds thereafter, no packets are sent. This allows for a combination of switches to be sensed even if they are not actuated at the same time. Integrated circuit U4B detects any switch activation and generates the SSWITCH signal. After this delay, the SSWITCH input to the fast clock enable circuit 161 selects a twice per second rate to send packets until the packets have been sent with the switch information. The output of the switch latches 87, 88 and 89 are fed into the data packet via the integrated circuit U7.

UA1, U2A and U2B are integrated circuits which are connected to an integrated circuit U16 to provide data and output to integrated circuit U7.

It should be appreciated in conjunction with the foregoing description that the meanings of the various combination of switch activations of the switches 87, 88 and 89 can be changed by the central logic programming. For example, one such switch function could be assigned for testing the transmitter and receiving. Pressing the test button causes all receivers which receive the signal to emit a short distinctive beep and flash an LED. This allows a user to check the transmitter or receiver with no side effects.

Another function which could be assigned to the switches would be to indicate to the central logic of unit 22 of the system 21, that the wearer of the transmitter 31 desires privacy. By pressing the appropriate switches of the switches 87, 88 and 89 would instigate a private mode for that transmitter and would cause the first receiver to receive the signal to emit a short distinctive beep and flash an LED. That switch also could be used to designate to the central logic unit 22 that the wearer wishes to clear a previously set status such as "privacy". Pressing the clear switch combination would cause the system to clear the private mode for that transmitter cause a first receiver which receives the signal to again emit a short distinctive beep and flash an LED. The switches 87, 88 and 89 also could be used to designate an emergency situation to the central logic unit 22. For example, pressing two of the switches could cause an "emergency one" or an "emergency two" alert to be transmitted to the receiver which would establish a special status situation for room in which the emergency was first reported. The receiver detecting s uch an emergency code could emit a distinctive continuous beep and an LED flash. The rooms emergency status condition could be cured by pressing clear on any transmitter in the room where the emergency was generated.

Although in the present embodiment of the transmitter three momentary switches 87, 88 and 89 have been shown, it should be understood that fewer or greater number of switches can be utilized if desired to offer the three bit status code transmitted at the end of each packet. Pushing a switch can also be utilized to reset a transmit interval counter and to thereafter initiate an immediate packet transmission. As can be seen from the foregoing, all switch operations can result in immediate feedback from the nearest detecting receiver as for example by a distinctive beep and an LED flash. While the button message assignment is arbitrary, assigning emergency codes to be initiated by pushing multiple switches simultaneously reduces the chance that accidental emergency code transmissions can occur.

It should be appreciated that the momentary contact switches 87, 88 and 89 and the switch logic 186 can be replaced with a conventional serial or parallel data communications port and that the transmitter 31 can be used to send data from a portable or fixed personal computer hand held terminal or other data processing device. By adding conventional receiver elements to the transmitter 32, the result is a transceiver which creates an infrared port that does not require wire or fiber optic connections. With an infrared link, a portable device such as a personal computer that can move throughout a facility while maintaining connection to other computer devices on a network. Because of the very low power consumption of both the transmitter and the receiver circuitry, the infrared link would not materially affect the power consumption of the portable device.

The system and apparatus 21 as hereinbefore explained also includes a magnetic programmer 33 which is shown in FIG. 3 and consists of a conventional pulse generator 187 which produces two sets of pulses, one to enable and one to transmit actual data to a pair of transistors Q30 and Q40 to two spaced apart antennae 188 of the same type as the antennae in the portable transmitter 31 hereinbefore described. The pulse generator 187 is controlled from a personal computer 189 which is provided with a software program for encoding the transmitters 31 magnetically through radio frequencies as hereinafter described under the control of the personal computer 189.

The system and apparatus 21 also includes an infrared programmer 34 which is shown in FIG. 4 and consists of a transmitter 191 which can be of the type provided in transmitter 31 and is capable of emitting infrared signals which can be utilized for programming the receivers 24. The transmitter 191 is under the control of a portable computer 192. The portable computer 192 is provided with a software program which can be utilized for programming the receiver 24 as hereinafter described.

Figures 10, 11:
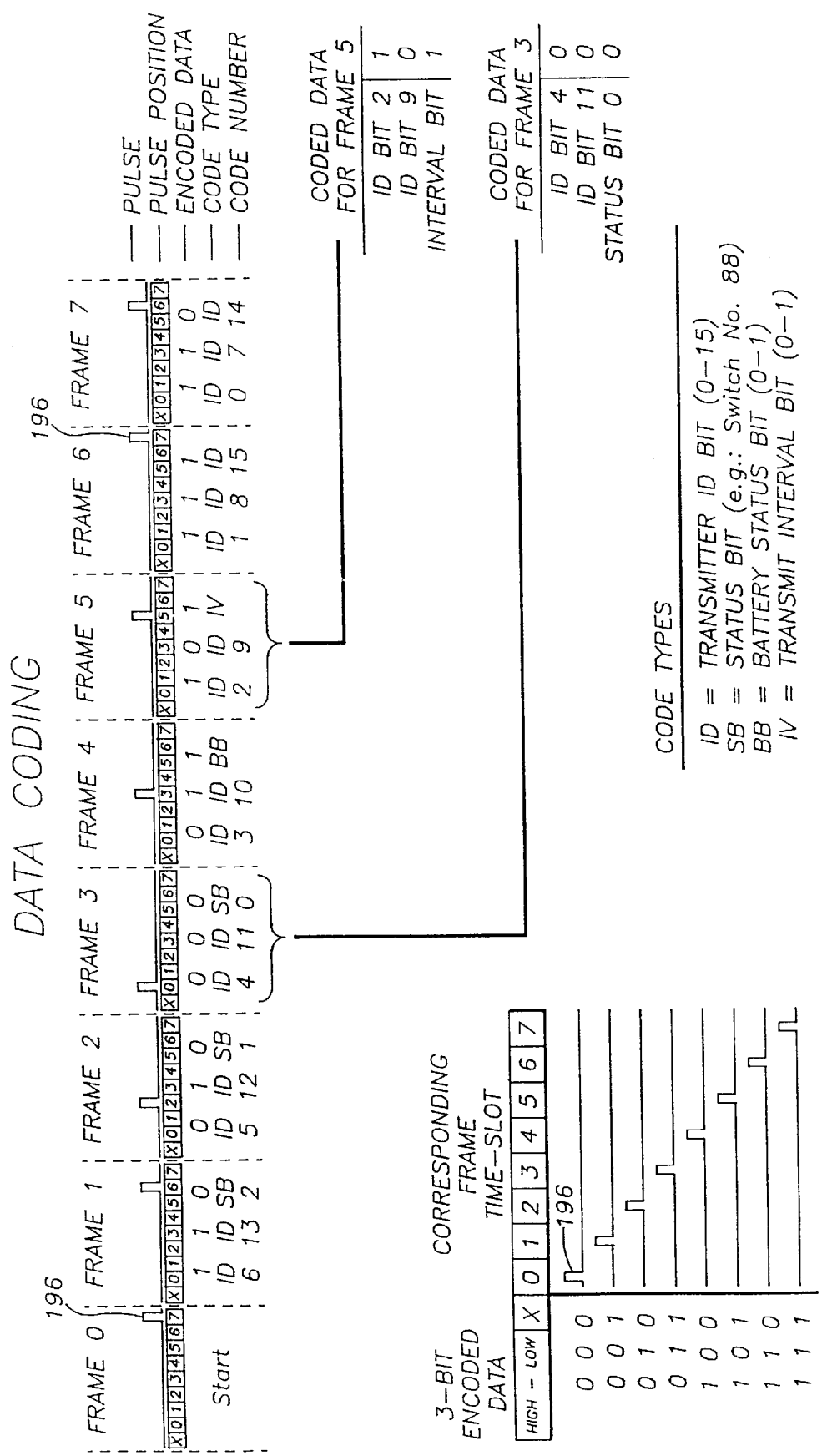
FIG. 10 shows a data coding diagram for the present invention.
FIG. 11 is a data encoding diagram showing the manner in which 3-bit encoded data is produced in the present invention.

The operation and use of the optical data communication and location apparatus and system 21 of the present invention in connection with the transmitters 31 hereinbefore described may now be briefly described in performing the method of the present invention as follows. A data coding scheme is utilized to minimize battery power consumption and is shown in FIGS. 10 and 11. As hereinbefore explained, the diodes 127 are utilized for transmitting packets of infrared data pulses. The transmitter 31 includes the capability of generating a data code for these data pulses having a finite number of time frames greater than one or expressed in other words at least two time frames which by way of example have been identified as frames 0 through 7 in FIG. 10. Each time frame is divided into a finite number of data time slots greater than one, or in other words at least two time slots. Each frame consists of exactly one pulse 191 in one data time slot so that there are encoded n-bits of binary data in each frame of a data packet where $2^n$ is equal to the number of data time slots in a time frame. In such an arrangement battery power consumption is decreased by a factor of n.

In the data coding scheme shown in FIG. 10, the code types are shown for a representative message to be transmitted. Thus, there are shown eight pulses, one in each of eight frames with each frame being shown with nine time slots. From such a scheme it can be seen that infrared packets which are sent by the transmitter 21 use one pulse to send three bits of information thereby keeping battery power consumption low. It should be appreciated that the same scheme can be expanded or reduced so that one pulse can be encoded with more or less bits by increasing or decreasing the quantity of time slots in each frame without affecting power consumption.

All infrared packets from all transmitters use the same energy because they always transmit exactly eight pulses, independent of the data content. This makes battery life predictable and permits automatic correction of errors.

As shown in FIG. 10, the first frame, FRAME 0 in a packet is reserved as a start flag. FRAME 0 always contains a single infrared pulse 196 in the eighth data time slot (ninth time slot in the frame) counting from zero to seven. The remaining seven frames of the eight frames each encode three bits of data with a pulse 191 in exactly one of the nine time slots. FRAME 1 illustrates a pulse in data time slot 6 which encodes the three bit binary number (110) shown underneath the frame. Below the binary code is the data assigned to each bit. In FIG. 9 there is illustrated the data time slot pulse position coding of the three bit data. Each pulse 196 denotes a "one" in that time slot in the frame.

It can be seen that the first time slot in each frame is used as a frame delimiter and never contains an infrared pulse. In FIG. 10, the delimiter time slot is labelled "x". No pulse is allowed to be present in this delimiter time slot. This restriction guarantees that there will always be at least one empty time slot between two consecutive infrared pulses. Seven frames encoding three bits provides a total of 21 bits of data. The 21 bits is comprised of a 16-bit transmitter identity code, a 1-bit low battery or special function code, a 1-bit indicating the programmed transmit interval for the transmitter, and a 3-bit code determined by the status of transmitter push button switches 87, 88 and 89 which are activated. In connection with the description of the data code and scheme as shown in FIG. 8, each time slot is approximately four microseconds in length which gives a total transmit packet time of:

Eight Frame/Packet×9 time slots/frame×4 microseconds/time slot= 288 microseconds Each of the infrared pulses is two microseconds wide. Ideally the infrared pulse is centered in the middle of a four microsecond time slot. In connection with the present invention, it should be appreciated that narrower pulses and higher clock speeds can speed transmission and that more frames or more time slots per frame increase the encoded data.

Figure 8:
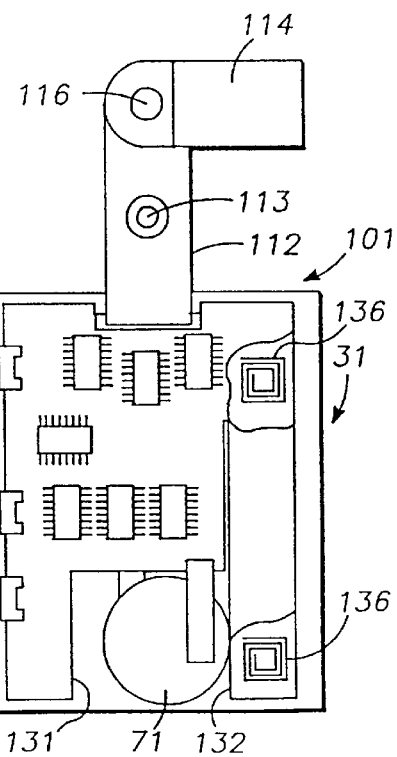
FIG. 8 is a view of the back side of the transmitter shown in FIG. 5 with the back cover removed.

The data coding scheme shown in FIGS. 8 and 9 provides a low overall power consumption. It equalizes transmitter power consumption for all transmitters irrespective of the transmitted message. It permits automatic receiver timing adjustment for transmitter timing errors. It makes possible reduced message collisions and it prevents repeated collisions due to transmitters becoming synchronized. Automatic collision detection and automatic detection of missing data allows automatic detection of weak signals, automatic infrared noise rejection immunity to interference from carrier based infrared signals and no interference to carrier based infrared communications.

As hereinbefore explained, the transmitter timing is derived from an inexpensive ceramic resonator time base in each transmitter which has an accuracy to only one percent. Thus in a worst case scenario the cumulative area of error or 72 bit times could result in a pulse being detected one bit time too soon or with one bit time too late. Timing drift compensation invention continuous sent invention continuously adjusts the receiver pulse sampling to keep pulses centered in bit time slots. Frequent phase adjustments during receipt of a packet allow the system to work even if there is a large frequency of difference between the transmitter and the receiver thus permitting the receiver also to utilize an inexpensive time base such as a ceramic resonator. In addition to providing identical power requirements for all transmitters, the data modulation technique or method herein disclosed incorporates self correcting timing. In FIG. 10 there is disclosed a method of error detection and receiver clock timing drift compensation utilized in connection with the present invention. As pointed out, there very well may be clock differences between the transmitter and receiver clocks as a result of the lack of precision and drift of inexpensive time bases such as ceramic resonators as utilized in the present invention; drift in related parts such as resistors and capacitors; and temperature differences in clock components. As hereinbefore explained the data packets or pulses consist of eight frames, each of which is divided into nine time slots of which eight can contain a data pulse. When each infrared pulse is received, the time slot of the leading edge of the pulse is recorded by the main processor 51 of the receiver 24 and its clock is adjusted so that the pulse is centered in the start flag time slot. Consequently, the clock in the receiver is adjusted so that the next infrared pulse should be properly received in the center of its time slot.

Figures 12A, 12B, 12C:
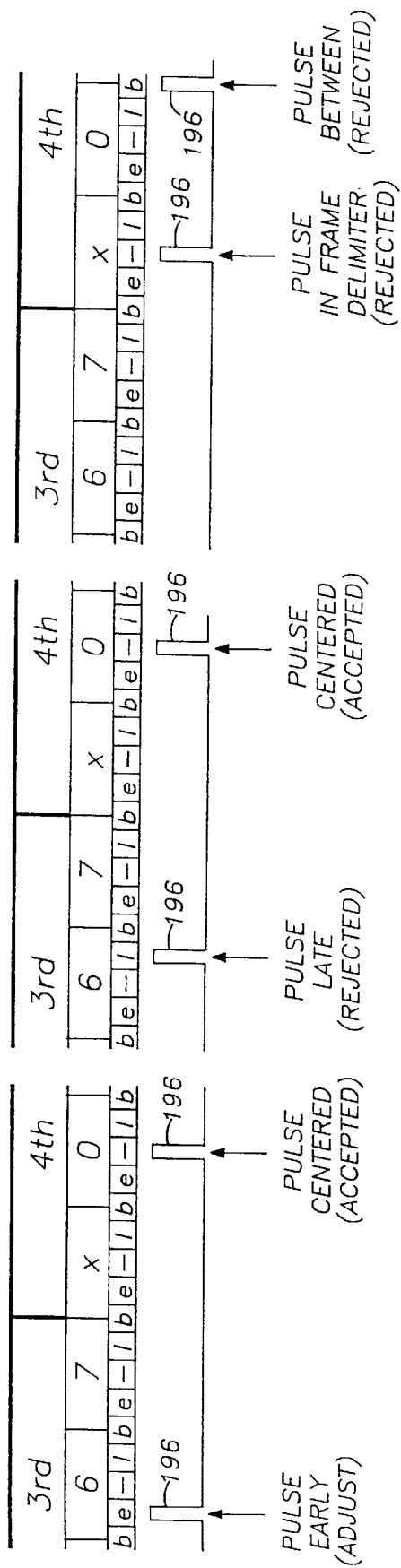

FIGS. 12A, 12B and 12C show how each time slot is divided into three legal pulse position areas, "e" (early), "—" (centered) and "1" (late), plus one illegal area "b" bridging two time slots. If any of the seven subsequent pulses is received earlier than it should arrive as shown in FIG. 12A, the receiver clock time is adjusted back by one position so that the next pulse will be received in the center of the time slot and will be accepted. A pulse which is received in the "late" position causes the receiver to adjust its time clock back one position and will be initially rejected as shown in FIG. 12B. Similarly as shown in FIG. 12B, if a pulse is found to be between or bridging two time slots, the packet is rejected. Similarly if a pulse 196 is found in the frame delimiter time slot as shown in FIG. 12C, the packet is rejected.

In summary, in FIG. 12A there are shown time slots 6 and 7 of the third frame and time slots x and zero of the following fourth frame. Below the time slots are the four phases of the time slot clock. The pulses 196 under the phases of the time slot clock represent examples of received infrared pulses in the various phases of the time slot clock. In FIG. 12A, the first frame shows the data pulse 196 (value 1, 1, 0) arriving early during the "e" period so that the clock is adjusted such that the next data pulse 196 (value 0, 0, 0) is centered in the frame (during the "—" period). In FIG. 12B, the fourth frame shows the indeterminate or bridging data pulse 196 (value between 1, 1, 0 and 1, 1, 1) arriving either too late to be a "6" or too early to be a "7" (during the "1" period). This packet is rejected.

In the unlikely event of a collision of the transmissions between two or more transmitters, the overlapping of packets are always detected as an error because it results in more than one pulse in at least one frame as illustrated in FIG. 12C. This flow chart, of course, illustrates the computer program executed by the main processor 51 in the receiver 24 of FIG. 2. And, of course, normally this program would be stored in non-volatile memory 62. It is understood that this function could be done remotely by processing logic shared by multiple receivers.

In step 301 there is a search done for an infrared pulse as it would be received by the packet decoder 49 (FIG. 2). Amplifier 47 is a multi-stage amplifier which discriminates against noise. Pulses which are too short do not pass the amplification stages due to speed constraints of the stages as constructed. Pulses which are too slow in rise and fall times are filtered by the AC coupling. Pulses which are too low in amplitude do not create a logic level at the amplifier's output, and are thus rejected. As discussed above, the multi-stage amplifier provides for amplitude level indication which is sensed by level detector 48. When a transmitter is detected by more than one receiver, as in a large open space, the relative signal strength detected by each receiver enables the central logic to determine which receiver is closer to the transmitter. When a suitable pulse occurs, step 302 indicates the infrared pulse (IR) has been detected and a timer is started at 303. This timer, of course, is basically regulated by clock 61 which is divided down to provide, in effect, a secondary clock and the eight time slots in each frame indicated in FIGS. 12A, 12B and 12C.

In step 304 as discussed above if there is a pulse in the frame delimiter slot, as illustrated in FIG. 12C, the entire packet is rejected, as indicated in step 305. The next check, step 306, is whether there is a pulse in or between two time slots; in other words, when a pulse is bridging two slots, the entire packet is rejected (see FIG. 12B).

Next, in step 307, is a test whether there is a pulse in the next eight time slots. Since by definition, in a pulse modulation device, a pulse must occur in every frame and there are eight time slots in each frame; if no pulse occurs, then there is a missing pulse. Again this is clearly error. Consequently, the entire packet is rejected.

In step 308, if there is a pulse in more than one time slot (meaning that there is more than one pulse in the frame) the packet is rejected. For example, this might occur in the event of a collision of the transmissions between two or more transmitters as discussed above.

The next error check is whether the pulse is centered as discussed in conjunction with the early pulse of FIG. 12A or a late pulse as illustrated in FIG. 12B. If the pulse is not centered as shown as step 309, then in step 311 if the pulse is early, this indicates the timing is slow and the timer is adjusted forward one position in step 312; or if late as in step 313, in step 314 the timer is adjusted back one position. And in both situations, the next pulse received is guaranteed to not be off by more than half a time slot as a result of clock errors in the transmitter's inexpensive time base; consequently, subsequent timing errors can also be corrected without the loss of data.

When none of the foregoing tests have detected an error, step 316 processes the pulse. Step 317 checks to determine whether the pulse is the eighth in the packet. If not, a loop at 320 is made. If so, the packet is processed in step 318 and the pulse counter is reset, step 319, to await the next packet.

Missing pulses in the received packet which are caused by weak signals are always detected as an error. Noise which causes long IR pulses, short IR pulses or pulses with varying amplitudes is detected by the level detector 48 and is automatically rejected. Much of the ambient IR noise in buildings is related to the 50 to 60 Hertz power utilized therein. Therefore, by having a packet duration much shorter than the power cycle, the likelihood of interference caused by high levels of noise at one phase of the power cycle is low.

Because of their short duration, the short IR packets and very short IR pulses of this system and method of the present invention tend to cause little or no interference with other systems utilizing an infrared carrier or line-of-sight or directional infrared. Infrared systems that utilize a carrier or are line-of-sight and directional energy will not interfere with the short IR packets or the very short high energy IR pulses of the system and method of the present invention.

If random infrared noise pulses are received after the first pulse, they are detected as noise and ignored. The number of possible legal codes received is:

| | |
|---|---|
| possible -- $2^{64}$ | (each of the remaining 64 time slots in the packet may or may not have a pulse) |
| legal -- $2^{21}$ | (each of the seven remaining infrared pulses may be received in one of eight legal positions) |

In addition, pulses must occur near the middle of a time slot, and all pulses must be about the same energy. Therefore, the probability of random pulses occurring in the proper time slots and at identical energy levels such that they would be recognized as legal code is less than 1 in $2^{43}$. In practice, random received infrared pulses will tend to be the wrong pulse width and not of a constant energy level, resulting in rejection. Lastly, for infrared noise to be accepted as data, there must be exactly one noise pulse, of the correct pulse width, in the center of a one time slot in every frame. Therefore, the probability is vanishingly small of random noise pulses being accepted as a valid transmitter message.

Figure 13:
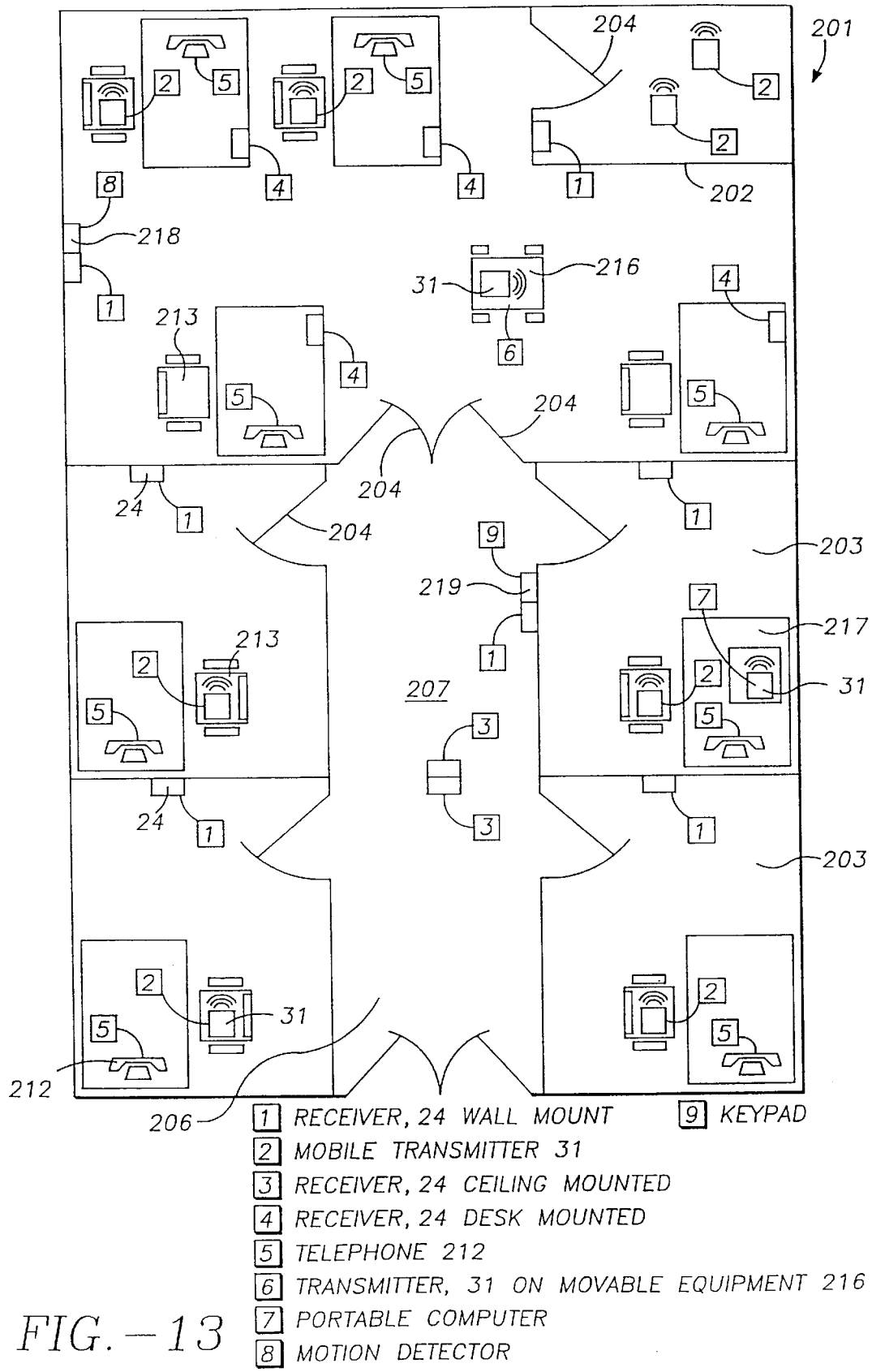
FIG. 13 is a schematic floor plan showing the manner in which the system, apparatus and method of the present invention can be used for locating personnel and movable items.
Figure 15A:
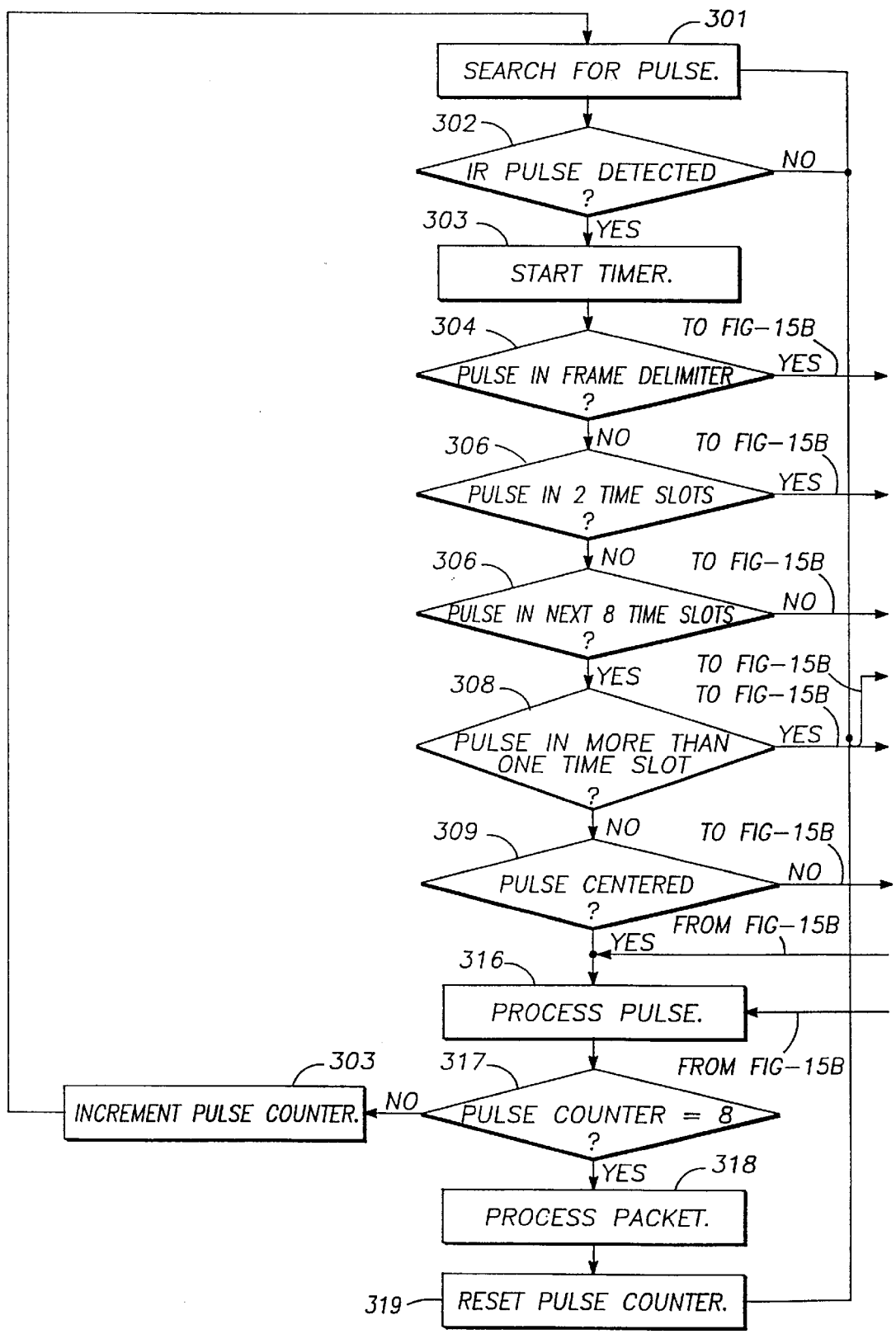

The operation and use of an optical data communication and location system 21 in a facility 201 which is shown in FIG. 13. A facility by way of example can be a hospital which is provided with walls 202 that are impervious to the optical energy being utilized for data communication and location as for example infrared. The walls 202 form a plurality of spaced apart rooms 203 which are accessible through doors 204 opening into the rooms and giving access to a hallway 206. Typically such a facility would also be provided with a ceiling (not shown) and a floor 207. The rooms 203 can be provided with desks 211 having telephones 212 thereon and chairs 213. As shown by the coded numbers 1 through 9, receivers 24 are indicated as being wall mounted, ceiling mounted and desk mounted. Transmitters 31 are indicated in various positions. Movable equipment 216 which is desired to be tracked can have transmitters 31 secured thereto. Such equipment can include portable medical carts, cardiac monitors, etc. Portable computers 217 having transmitters 31 secured thereto also can be tracked. Motion detectors 218 can be mounted in appropriate locations. Key pads 219 for securing the premises can also be provided near appropriate doorways.

It should be appreciated that FIG. 13 only shows a small number of the rooms and hallways which may be provided in a facility and that typically the central logic unit 22 would be installed in the facility in a location which is preferably near the geometric center of the receivers typically within 2,000 feet of the most remote receiver. Typically the receivers mounted in a facility should be mounted in such a manner so that they have an unobstructed view of the rooms in which they are installed. If the receivers are associated with movable items which may later be placed in front of the receivers, the receivers should be positioned so that they will remain unobstructed even if the movable items are in fact moved. Typically the receiver should be mounted high enough in the room so that optimum reception is obtained. For example mounting the receivers on walls from 7 feet to 9 feet 6 above the floor gives a receiver the best vantage point. The receiver should also be mounted on a surface so that it faces into the room. It should not face the doorway into the room where it could detect people in the hallway as being in the room when they are not. Thus, the receivers should face an interior wall. Typically, the receiver should be placed midway along the wall because a single receiver of the present invention will generally provide good room coverage for a room 20'×20' square office or a patient room. In hallways the receivers should be mounted approximately 25' apart along the hall. Again they should not be placed so that they view directly into a doorway across the hall.

Upon installation of the apparatus and system 21 of the present invention, the transmitters 31 should be encoded with the desired identification codes so that they can be tracked. These transmitters 31 can be programmed one at a time by use of the magnetic programmer 33. The desired codes are supplied from the personal computer 189 to the pulse generator 187 which generates two sets of radio frequency pulses with one set providing enable pulses and the other set providing the actual data to the transistors Q30 and Q40 which are operated to supply the information to the antennae 188 to be coupled into the corresponding antennae 136 of the transmitters 31. The transmitters 31 can thus be encoded one by one in a separate location or at the location 201.

Thereafter, in readying an installation for use, the receivers 24 are programmed. This is accomplished by utilizing the infrared programmer 34. By way of example, infrared programmer 34 can be taken into a room which has one of the transmitters 31 therein. Utilizing the information in the software program in the portable computer 192, the transmitter 31 which can be coupled to an IO port of the computer 192 can be utilized for sending infrared pulses from the transmitter 191 to the receiver 24 within the room to activate the receiver 24 and to provide the receiver 14 with an identification code. The receiver 24 after receiving this identification code transmits this identification information to the central logic unit 22 through by way of example hard wiring to place in the central logic unit 22 the location of the receiver 24 sending in the identification code and the identification code for that receiver. Thereafter, the infrared programmer 34 can be taken into the next room where there is a receiver and the same procedure carried out until all of the receivers in the facility have been provided with identification codes which have been inserted into the central logic unit 22.

As hereinbefore explained, the function of the infrared receivers 24 provided in the facility is to receive infrared packets from nearby transmitters 31 and report the receipt of these packets to the central logic unit 22 of the identification code, battery status and switch status of each of the transmitters from which infrared packets have been received. In addition, the receivers control an LED and a beeper and may control the speaker for audio communications as hereinbefore explained.

In general as can be seen from FIG. 13 the infrared detecting receivers 24 are located strategically within rooms or other spaces so as to receive line-of-sight and reflected infrared signals from any transmitters 31 present in the room. In a larger room such as an auditorium, multiple receivers 24 are installed to receive infrared signals from the entire space. In special applications where greater resolution of the locations inside a room is desired such as a large office having work spaces separated by movable space dividers, receivers are installed in each work space. In other special applications such as resolving the location of an individual object to within a few feet, receivers are installed with shades and/or of reduced sensitivity to restrict their range and viewing angle.

The receivers 24 store valid ID codes received from the transmitters 21 for transmission to the central logic unit 22 of the system 21. As hereinbefore explained, each receiver 24 can have a piezo transducer, an LED, a speaker, and an infrared motion detector. The piezo transducer functions as a tone generator to provide audible signaling tones. The LED provides visual signaling. The speaker provides for one-way or two-way audio communication under the control of the central logic unit 22. In security applications, the infrared motion detector 218 can be used in conjunction with the current transmitted ID messages to determine whether unauthorized personnel are present at the receiver location. If motion is detected and there are no allowed transmitter ID's present an alarm is sounded. Similarly, if unauthorized ID's are present, an alarm is sounded. Access control can be achieved by a restricted range receiver controlling the door lock or a key pad 219. The doors would only allow access if the person trying to enter had an authorized transmitter and the correct lock combination or key.

From the teaching of the present invention, the transmitters 31, the receivers 24 as well as the central processing unit 22, can be readily constructed to detect the infrared signals and to convert them to electrical signals which can be read by digital logic. The main processor 51 of the receiver 24 is based on a microcomputer which is utilized to process infrared packets received from nearby transmitters to keep track of timeouts and process messages received from the central logic unit and process commands received from the central logic unit. The main processor also includes a clock and a set of the memory data registers. Each receiver has a unique 16-bit receiver identification number stored in a non-volatile memory register. The 16-bit identification provides for over 65,000 receivers. A larger receiver identification number would provide for more receivers if that is desired.

The central logic unit can send commands to specific receivers or can send a general query to all receivers simultaneously to locate a specific transmitter. If a telephone call is being received for a person when there are several persons in the room having a telephone therein, the receiver 24 can be used to communicate audibly which of the persons in the room is to pick up the telephone in that room.

The general operation of the apparatus system and method is very similar to that disclosed in U.S. Pat. No. 5,062,151. In placing the system in use, the identification codes of the receivers 24 and the transmitters 31 are encoded into the central logic unit with the receivers being identified with respect to locations in a facility as for example the facility 201 shown in FIG. 13 in the manner hereinbefore described. Assuming that the apparatus, system and method is to be utilized for locating personnel in a facility as for example a hospital for locating nurses and physicians, the transmitters with their identification codes would be assigned to the personnel with each physician or nurse or other person desired to keep track of in the facility being assigned a transmitter. As described in U.S. Pat. No. 5,062,151 the apparatus in the system is able to carefully and accurately monitor the location of personnel in the facility by ascertaining which receiver is physically closest to a transmitter. The transmitters carried by the personnel are capable of sending messages of various types. The receivers 24 as shown in FIG. 11 can be monitored so that they can monitor individual rooms, locations in rooms hallways and the like so that the apparatus and system is capable of continuously monitoring the location of personnel. Personnel in a facility may be given a message over the transmitter to use the closest telephone 212 as shown in FIG. 13.

When the system apparatus is utilized for monitoring the location of things which may move slowly or infrequently, the apparatus, system and method of the present invention also can be utilized in such applications.

The apparatus, system and method of the present invention is one in which a large number of receivers and transmitters can be accommodated. A data coding method has been utilized which makes this possible and also makes it possible to make the transmitters very light and portable with the capability of utilizing power supplies which utilize ambient radio frequency or ambient light energy. When necessary batteries can be used. The battery can be relatively small and lightweight which in most applications can last as long as a year or several years. Battery life is periodically monitored in the apparatus, system and method and gives a warning when the battery should be replaced. The system is reliable and immune to noise. Data collisions are minimized. False data is not recorded. A plurality of light emitting diodes are provided for emitting sufficient power to ensure that the transmitter can be readily located by the closest receiver. The receivers have the capability of determining the power level of the transmitted infrared pulses from two to more transmitters and is capable of discriminating against the more remote transmitter having a lower power level thereby minimizing interference between transmitters. The receivers are programmed so that information is transmitted only if new or changed data is received by the receivers.

Figure 14:
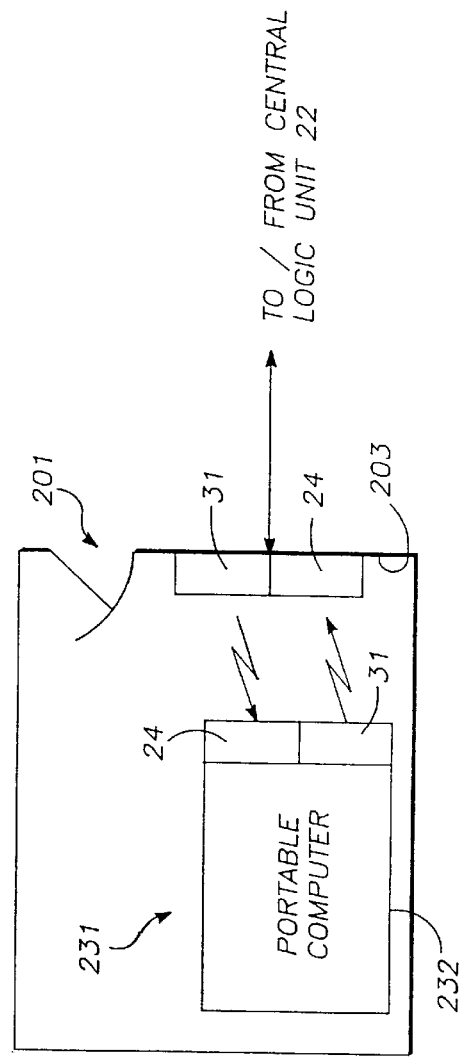
FIG. 14 shows a portable data link using the apparatus and system of the present invention.

The apparatus and system 21 of the present invention can be utilized with a portable data link as shown in FIG. 14. As shown therein, the portable data link can be provided in a facility 201 of the present invention by providing in one of the rooms 203 a transmitter 31 and a receiver 24, both in a stationary position in the room as for example on the wall of the room which are coupled to the central logic unit 22. The transmitter 31 and the receiver 24 establish communication with a portable data link in the room in the form of a computer system 231 which includes a portable computer 232 of a conventional type which has secured to the input and output ports thereof a transmitter 31 and a receiver 24. Thus, the computer system 231, as a portable data link, can establish communication between the transmitter 31 and the receiver 24 mounted in the room 203. In this way, two-way communication can be established between the person utilizing the computer system 231 in conjunction with the apparatus and system which is installed in the facility 201 through the central logic unit 22.

From the foregoing, it can be seen that there has been a provided optical data communication and location apparatus, system and method which provides continuous real time information on the location of people, equipment files and other mobile objects in a facility which does not require line-of-sight transmission.

What is claimed is:

1. A transmitter for use in an optical data communication and location system for at least one location with at least one receiver at said at least one location comprising a portable case, a printed circuit board mounted in the case, at least one optical emitter which is visible from the exterior of the case mounted in the case and connected to the printed circuit board for emitting optical energy, a power supply connected to the printed circuit board and circuit means mounted on the printed circuit board and coupling the battery to the optical emitter for causing the optical emitter to transmit date packets of data pulses representing bits of binary data, said circuit means including means for generating a data code having a finite number of time frames greater than one, each time frame being divided into a finite number of data time slots greater than one, each frame having therein exactly one pulse in one time slot to encode n-bits of binary data where $2^n$ is equal to the number of data time slots including means for sensing a missing pulse in any frame and rejecting said data packet.

2. A transmitter for use in an optical data communication and location system for at least one location with at least one receiver at said at least one location comprising a portable case, a printed circuit board mounted in the case, at least one optical emitter which is visible from the exterior of the case mounted in the case and connected to the printed circuit board for emitting optical energy, a power supply connected to the printed circuit board and circuit means mounted on the printed circuit board and coupling the battery to the optical emitter for causing the optical emitter to transmit data packets of the data pulses representing bit of binary data, said circuit means including means for generating a data code having a finite number of time frames greater than one, each time frame being divided into a finite number of data time slots greater than one, each frame having therein exactly one pulse in one time slot to encode n-bits of binary data where $2^n$ is equal to the number of data time slots and where there are a plurality of receivers and transmitters at said one location including means for detecting the amplitude of the energy in each of the data packets being received from said plurality of transmitters to allow one receiver to ascertain which transmitter is closest to it or to determine which receiver is closest to a particular transmitter.

* * * * *